United States Patent [19]
Bod et al.

[11] Patent Number: 4,817,151
[45] Date of Patent: Mar. 28, 1989

[54] SELECTIVE DECODER FOR COMPATIBLE FM STEREOPHONIC SYSTEM UTILIZING COMPANDING OF DIFFERENCE SIGNAL

[75] Inventors: Murray L. Bod, Flushing, N.Y.; Renville H. McMann, New Canaan; Emil L. Torick, Norwalk, both of Conn.

[73] Assignee: Broadcast Technology Partners, Bloomfield Hills, Mich.

[21] Appl. No.: 118,614

[22] Filed: Nov. 9, 1987

[51] Int. Cl.$^4$ .............................................. H04H 5/00
[52] U.S. Cl. .......................................... 381/13; 381/3; 381/10; 381/11
[58] Field of Search ........................................ 381/2–4, 381/13–14, 10–11, 106; 333/14; 370/6, 20; 332/23 A

[56] References Cited

U.S. PATENT DOCUMENTS

| | | | |
|---|---|---|---|
| 4,388,493 | 6/1983 | Maisel | 179/1 GD |
| 4,485,483 | 11/1984 | Torick et al. | 381/14 |
| 4,534,054 | 8/1985 | Maisel | 381/4 |
| 4,602,380 | 7/1986 | Stebbings | 381/13 |
| 4,602,381 | 7/1986 | Cugnini et al. | 381/13 |
| 4,674,122 | 6/1987 | Orban | 381/106 |
| 4,704,727 | 11/1987 | Beard | 381/106 |
| 4,751,734 | 6/1988 | Rucktenward | 381/13 |
| 4,752,955 | 6/1988 | Torick | 381/13 |

*Primary Examiner*—Jin F. Ng
*Assistant Examiner*—David H. Kim
*Attorney, Agent, or Firm*—Spencer E. Olson

[57] ABSTRACT

A decoder for use in an FM stereo broadcasting system in which the usual difference signal S and a compressed version S' of the difference signal are transmitted, automatically selects on a continuous basis for de-matrixing with the received sum signal M either an attenuated signal S' or the usual difference signal S based on the protocol that the attenuated signal S' is always selected unless the usual difference signal S is higher in level than a predetermined threshold potential related to the signal level at the knee of the expansion characteristic. The decoder eliminates the need for the relatively expensive analog variable gain amplifier used in prior art decoders and is less sensitive to time constant errors and errors due to multipath distortions.

14 Claims, 4 Drawing Sheets

PRIOR ART

SELECTIVE DECODER FOR COMPATIBLE FM STEREOPHONIC SYSTEM UTILIZING COMPANDING OF DIFFERENCE SIGNAL

BACKGROUND OF THE INVENTION

This invention relates to FM stereophonic broadcasting systems of the type which utilizes compansion of the difference signal and, more particularly to a decoder for use in the receiver of such systems which employs stepped gain control circuitry.

U.S. Pat. No. 4,485,483, the disclosure of which is hereby incorporated herein by reference, describes a compatible stereophonic broadcasting system which utilizes companding of the difference signal. In this system stereophonically related audio frequency source signals L and R are matrixed to obtain stereophonic sum and difference signals M and S, respectively. At the transmitter, the difference signal is used to amplitude-modulate a first sub-carrier signal and is also compressed and the compressed version S' used to amplitude-modulate a second sub-carrier of the same frequency but in quadrature phase relationship with the first. Suppressed-carrier, double-sideband modulation is employed, with the frequency of the sub-carrier signal being sufficiently high to assure a frequency gap between the lower sidebands of the modulated sub-carrier signals and the sum signal. A conventional low-level phase reference pilot signal, lying within the gap, is provided for detection purposes at the receiver. The composite baseband signal comprising the sum signal, the two modulated quadrature sub-carrier signals, and the pilot signal (which composite signal will sometimes be referred to herein as an "FMX" signal) is frequency modulated onto a high frequency carrier for broadcast. ("FMX" is a registered trademark of Broadcast Technology Partners, Bloomfield Hills, Mich.)

The receiver of the system includes a demodulator for deriving the sum signal, the usual difference signal S and the compressed difference signal S', and an expander for complementarily expanding the derived compressed difference signal. The expanded noise-reduced version of the difference signal is matrixed with the received sum signal to obtain the original audio frequency source signals L and R. If desired, the usual difference signal S, instead of the noise-reduced version of the difference signal S', may be matrixed with the sum signal. Thus, the decoder described in U.S. Pat. No. 4,485,483 makes a one-time choice between either S' or S and thereafter only the initially selected version of the difference signal is matrixed with the sum signal.

Commonly assigned U.S. Pat. No. 4,602,381, the disclosure of which is also hereby incorporated herein by reference, describes an adaptive expander which works on the sum of signals S and S', and uses the usual difference signal S as a reference signal for controlling the expansion of the compressed difference signal S' so as to cause the amplitude of the expanded difference signal to be equal to the level of the usual difference signal. The expanded noise-reduced version of the difference signal is matrixed with the received sum signal to obtain the origional audio frequency source signals L and R. This adaptive expander, which will sometimes be referred to hereinafter as "the conventional "FMX" expander", depends for its operation on a relatively expensive analog voltage controlled amplifier.

In view of the relatively large increment of cost attributable to the voltage controlled amplifier, there is a need for an expander capable of performing on the quadrature difference signal the complement of the function performed by the compressor at the transmitter without using a voltage controlled amplifier. Accordingly, a primary object of the present invention is to provide a decoder for use in the receiver of an "FMX" broadcasting system capable of providing acceptable complementary expansion of a received "FMX" signal which is less expensive to manufacture than those heretofore available.

SUMMARY OF THE INVENTION

Briefly, the decoder according to the invention, intended for use in an FM stereo broadcasting system in which the usual stereo difference signal S and a compressed version S' of the difference signal are both transmitted, differs from the decoders discussed above in that it is based on the principle of automatically selecting on a continuous basis either an attenuated difference signal S' or the usual difference signal S for dematrixing with the received sum signal based on the protocol that the attenuated S' signal is always selected unless the usual difference signal S is higher in level by a predetermined amount, or that the level of the usual difference signal S exceeds a predetermined threshold level. This operation is achieved without the need for an expensive analog variable gain amplifier, and has the further advantages of being less subject to decoder errors due to multipath distortion, of having greater accuracy than the above-decribed decoders because it always expands the signal S' by the correct amount, and of not being as sensitive to time constant errors as the system described by Cugnini et al (U.S. Pat. No. 4,602,381).

BRIEF DESCRIPTION OF THE DRAWINGS

Other objects, features and advantages of the invention, and a better understanding of its construction and operation, will be had from the following detailed description, when considered in conjunction with the accompanying drawings, in which.

DETAILED DESCRIPTION OF PREFERRED EMBODIMENT

The "FMX" broadcasting system, in which use of the decoder disclosed herein is intended, is compatible with the existing two-channel stereo system approved by the FCC in that the transmitted signal has a baseband spectrum comprising a monophonic channel M from about 50 Hz to 15 kHz, a 19 kHz pilot, a conventional stereo difference channel S from 23 kHz to 53 kHz, and in accordance with the teaching of U.S. Pat. No. 4,485,483, a compressed difference signal S', the two difference signals being amplitude-modulated on respective 38 kHz quadrature sub-carriers. In accordance with the teaching of commonly assigned U.S. Pat. Nos. 4,602,380 and 4,602,381, the difference signal is compressed according to the audio compression characteristic illustrated in FIG. 1. The segment AC of the line labeled S has a linear slope representing the output as a function of input for the usual stereo difference signal S. The segment DEF of the line marked S' represents the compressed difference signal. It will be noted that there is a fixed difference between the two curves over the line segment AB of the curve S and the line segment DE of the curve labeled S', which difference may be referred to as a fixed reference gain. Going from left to right between points E and F on the curve S', it is seen that the difference between the S and S' curve becomes smaller and smaller, becoming zero when the two curves intersect at point F. Then curve S' drops off rapidly and curve S continues as a straight line up to point C, causing the difference between the two curves to change polarity and increase. The dashed line adjacent to curve S' represents the sum of the S and S' signals. It is the function of all "FMX" decoders to restore the signal representing the sum of a proportion of the usual difference signal and a proportion of the compressed difference signal complementarily to the compression characteristic so as to be equivalent to the S signal. In the conventional "FMX" decoder described in U.S. Pat. No. 4,602,381, this is accomplished by a combination of three functions: (1) for segment FC a fixed reference gain is applied; (2) for segment DE a fixed gain is also employed but with a value of $k^{-1}$, the reciprocal of the compression factor k used in the encoder; and (3) for segment EF a variable gain amplifier is used. Thus, the conventional "FMX" decoder provides some noise-reduction for all low level signals up to the level represented by point F.

Figure 1:
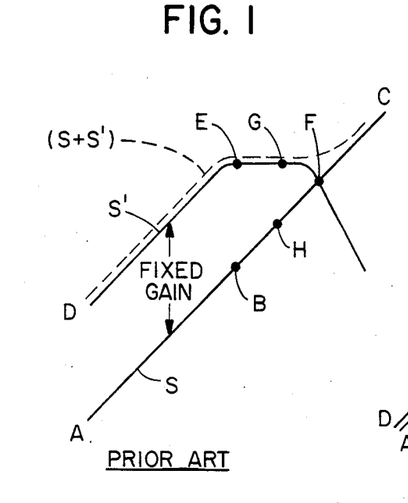
FIG. 1 shows the steady state compression characteristic of the companding law employed in the conventional "FMX" broadcasting system.
Figure 2:
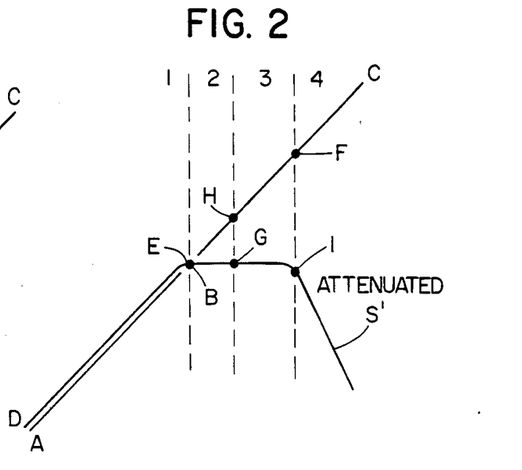
FIG. 2 shows the steady state transfer characteristics of the decoding system according to the present invention.

The principle of operation of the present invention, implementations of which will be described presently, is illustrated in FIG. 2 which includes the same curves S and S' as appear in FIG. 1 except that the compression characteristic (i.e., the curve S') is reduced in level (i.e., attenuated) by the amount of the fixed reference gain applied by the compressor such that segment AB of curve S coincides with segment DE of curve S'. Attenuation of the compression characteristic results in certain fixed relationships between the curves S and S' in the regions numbered 1, 2, 3 and 4 delineated by vertical dotted lines passing through paired points E and B, H and G and F and I. As noted previously, in region 1 the S and S' curves are exactly equal; going from left to right through regions 2 and 3 there is an increasing difference between the ascending straight line S and the substantially horizontal portion of the attenuated S' curve, and at point I there is an abrupt further increase in the difference between the two curves by virtue of the steep decrease in level of the S' curve. In its simplest form, the decoder according to the invention always selects the S' signal for dematrixing except when the signal S is higher in level in which case it is selected. Thus, in general, for low level signals having levels in region 1, the signal S' is selected for application to the dematrix stage, and for higher level signals, where any noise present in the signal is likely to be masked by the signal itself the segment EC of the curve S will be selected. Certain exceptions to this general protocol will be noted as the description proceeds.

Figure 3:
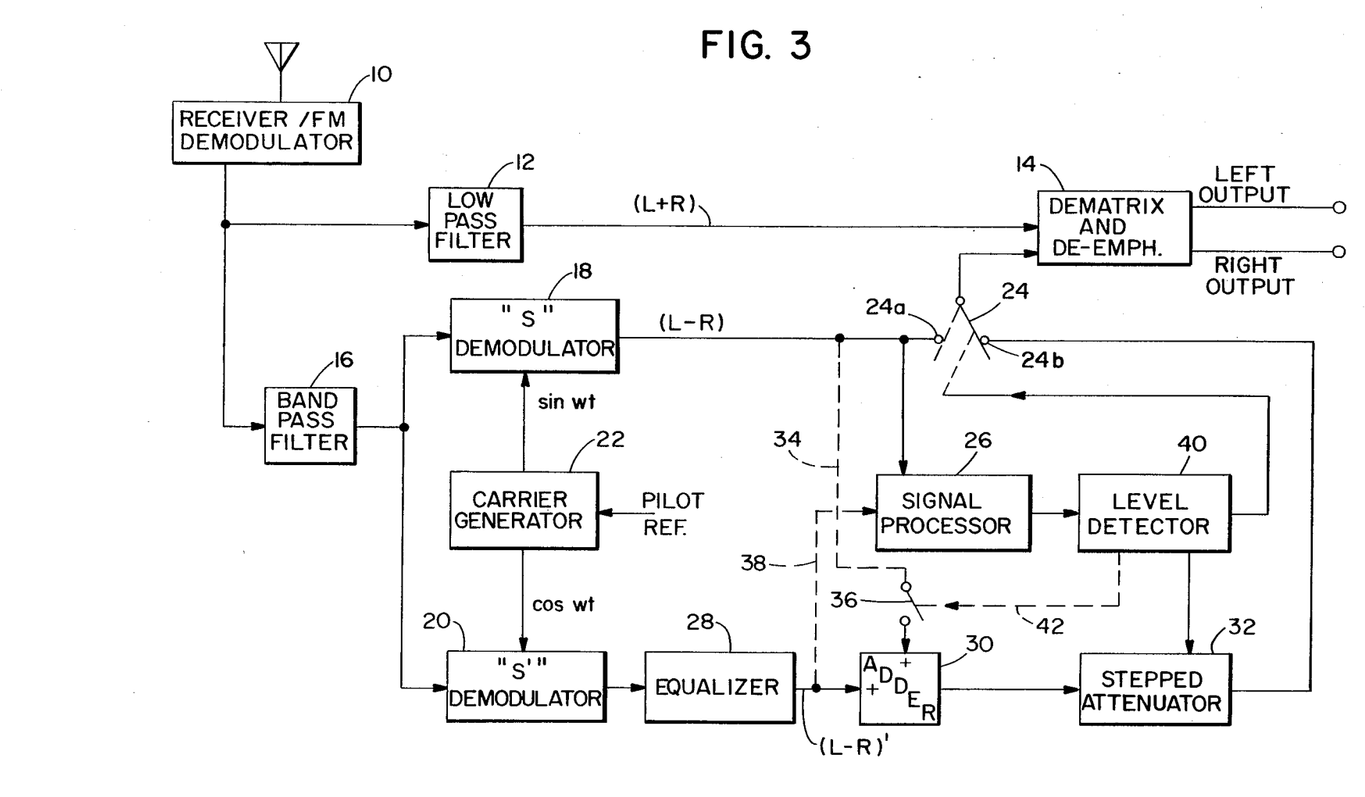
FIG. 3 is a simplified block diagram of a receiver constructed in accordance with the present invention.

FIG. 3 is a block diagram of a receiver adapted to receive an "FMX" signal having a quadrature difference signal compressed according to the characteristic depicted in FIG. 1 and utilizing a selective decoder constructed according to the present invention. For purposes of simplicity, some of the more conventional FM receiver circuits (e.g., RF and IF stages and discriminator networks) have not been shown and will be only briefly mentioned as necessary. Any received FM signal is amplified in the RF and IF stages (not shown) of a receiver/FM demodulator 10 and demodulated in any of the known FM detection circuits (not shown) to derive the audio signals contained in the received composite signal, namely, the signals M, S, S' and the pilot signal. The monophonic sum signal M is separated from the higher frequency components of the composite signal by a low-pass filter 12 and applied as one input to a dematrix and de-emphasis circuit 14 of conventional design. The remaining components of the composite signal are selected by a bandpass filter 16 designed to pass frequencies in the band from 23 kHz to 53 kHz and to reject frequencies outside this band and then applied to an "S" demodulator 18 and also to an "S'" demodulator 20. The pilot signal is derived by conventional means (not shown) and applied to a carrier generator 22 which regenerates sine and cosine versions thereof, which are applied to demodulators 18 and 20, respectively The output (L−R) of demodulator 18 is applied to one contact 24a of a switch 24 for selecting which of signals S and S' should be applied to the second input of dematrix circuit 14, and also to a signal processor 26. The output of demodulator 20 is applied to an equalizer 28 having a transfer characteristic which is complementary to that of the equalizer employed when encoding of the "FMX" signal at the transmitter and which produces at its output terminal an equalized compressed difference signal (L−R)' or S'. The (L−R)' signal is applied via an optional adder 30 to a stepped attenuator 32 the function of which is to attenuate the (L−R)' signal in steps of fixed amount and apply the resultant attenuated signal to contact 24b of the difference signal switch 24. In certain circumstances to be described, the (L−R) signal from demodulator 18 may optionally be added to the compressed difference signal (L−R)', as indicated by the dotted line connection 34 and switch 36 connected between the output of demodulator 18 and the second input to adder 30.

Control for stepped attenuator 32 is normally provided by signal processor 26 connected to receive the usual difference signal S from the output of demodulator 18 and a level detector 40; however, in circumstances to be described the compressed difference signal (L−R)' signal may optionally be applied to signal processor 26, as indicated by the dotted line connection 38. The signal processor 26 suitably conditions the applied difference signal (L−R) and, if applied, the compressed difference signal, in a manner to be described presently and applies to level detector 40 a processed signal having a level related to the level of the signal (L−R). The level detector, in turn, produces up to three control signals: (1) for selecting the appropriate "step" of the stepped attenuator; (2) for switching difference signal switch 24 from its illustrated normally closed position to the dotted line position, that is, to engage contact 24a; and (3) for closing switch 36 under certain signal conditions so that adder 30 adds the difference signal (L−R) to the equalized compressed difference signal (L−R)'. The compressed difference signal (L−R)' as attenuated by stepped attenuator 32 is normally applied via switch 24 to dematrix and deemphasis circuit 14 for dematrixing in conventional fashion with the sum signal (L+R) to produce left and right output signals; however, when level detector 40 generates a control signal indicative that the level of the usual difference signal exceeds the level of the compressed difference signal by a predetermined amount, or that the level of the usual difference signal exceeds a predetermined threshold level, switch 24 is actuated so as to instead apply the usual difference signal The block diagram of FIG. 4 differs from that of FIG. 3 in the respect that it additionally includes presently preferred implementations of the signal processor 26, stepped attenuator 32 and level detector 40 which were only generally disclosed in FIG. 3. Since the operation of the system otherwise is as described in connection with FIG. 3, only the details of such components will be described While it was said in the description of FIG. 3 that it was optional to apply the compressed difference signal (L−R)' to signal processor 26, in the arrangement shown in FIG. 4 it is processed along with the usual difference signal (L−R) to produce a signal for application to level detector 40. The output of equalizer 28 is applied to and attenuated by a fixed attenuator 50 by the amount of the "fixed reference gain" depicted in FIG. 1 so as to cause segment DE of the curve S' to coincide with the segment AB of curve S, as shown in FIG. 2. The attenuated compressed difference signal at the output of attenuator 50 is then full-wave rectified by a rectifier 52 and the resulting rectified output signal is subtracted by an adder device 54 from the rectified normal difference signal (L−R) produced at the output of a second full-wave rectifier 56. If attenuator 50 accurately maintains coincidence between the curves S and S' for signal levels in region 1 (FIG. 2), the level of the output signal from adder 54 will be zero throughout this region and then increase in level with the increasing divergence of curves S and S' in regions 2, 3 and 4. The output of adder 54 is applied to the input terminal of level detector 40 which, in this example, includes three comparators 60, 62 and 64. More specifically, the output signal from adder 54 is applied in parallel to the negative input terminal of each of the comparators, which may be differential amplifiers having different threshold potentials applied to their respective positive input terminals. The threshold potential of comparator 60, labeled "Thresh. 1" corresponds to the signal level represented by the difference between the full-wave rectified level of point B and the full-wave rectified level of point E in FIG. 2, which in this case is equal to zero. Consequently the comparator produces an output signal only if the level of the rectified signal applied to its negative input terminal is greater than the level of "Thresh 1" which indicates that signals S and attenuated S' are in region 2 or above in the diagram of FIG. 2. To enable the circuit to discriminate between region 2 signal levels and signal levels in regions 3 or 4, comparator 62 has a threshold potential labeled "Thresh 2" equal to the difference in detected level between point G on the attenuated S' curve and the point H on the S curve of FIG. 2. The third comparator 64 has a threshold potential N (signifying that the level detector may include additional comparators) corresponding to the difference between the detected levels of points F and I on the curves of FIG. 2, which if exceeded by the level of the signal from adder 54 would indicate that its level is somewhere in region 4. The signal level in this region is sufficiently high that whatever noise is present in the signal is likely to be masked by the signal itself and cannot be further reduced by expansion; accordingly, an output signal from comparator 64 is used to instruct the switch 24 that the usual difference signal (L−R) is sufficiently high in level that no further signal-to-noise improvement is necessary and that it should be selected for dematrixing in place of the compressed difference signal (L−R)'.

Level detector 40 also controls other functions, most importantly the stepped attenuator 32 which, in this illustrative embodiment, includes a plurality resistors 70, 72 and 74 all connected to the output of adder 30, of which resistors 70 and 72 are adapted to be switched in and out of circuit by respective switches S1 and S2. The output terminal of this parallel resistor network is connected to the negative input terminal of a conventional operational amplifier 76 having a feedback resistor R connected between the output terminal and negative input terminal. The output of operational amplifier 76 is applied amplifier stage 78, the sole purpose of which is to reverse the polarity of the signal from amplifier 76 so that the signal at its output terminal, which is applied to contact 24b of switch 24, will have the correct polarity to be de-matrixed with the received sum signal M Switches S1 and S2 are controlled by output signals from comparators 60 and 62, respectively and depending upon which of the switches are closed, the applied signal is attenuated in stepped fashion. The switches are both normally open so as to cause maximum attenuation of signals occurring in region 1, and only one is closed at a time in response to a control signal from a respective comparator. The described coaction between the level detector and the stepped attenuator causes the compressed difference signal (L−R)', when its level is in regions 1, 2 and 3 (FIG. 2), to be expanded according to the portion of curve S' lying between point D and I, and if its level is in region 4 the circuit automatically selects the normal difference signal (L−R) for dematrixing with the sum signal.

In the discussion thus far, only the equalized compressed difference signal (L−R)' has been applied to the stepped attenuator 32 and, indeed, there is no reason to have the normal difference signal (L−R) contribute to the signal to be attenuated when the signal level is below the knee of the expansion characteristic (i.e., approximately at print E or B) but if the signal level is in the flattened portion of the curve beween points E and I, there is some advantage to adding (L−R) to (L−R)' and applying the sum signal to the stepped attenuator The summation is effected by using an output signal from comparator 62, indicative of an input signal level in the flattened region 3 of the expansion characteristic, to close the normally open switch 36 so as to couple the normal difference signal (L−R) to the second input of adder 30.

Figure 3A:
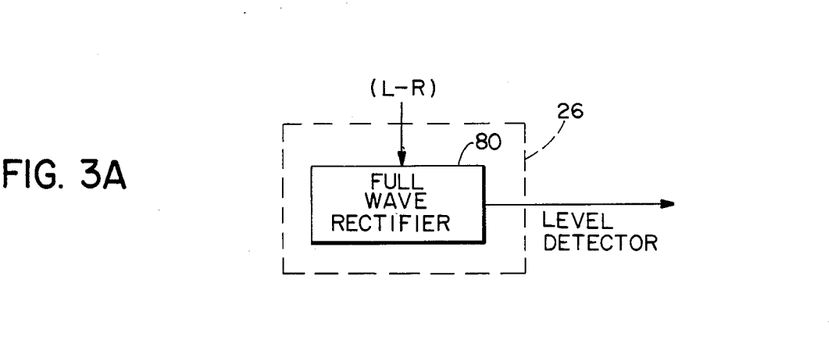
FIGS. 3A and 3B are simplified block diagrams of alternative implementations of the signal processor portion of the system of FIG. 3.
Figure 4:
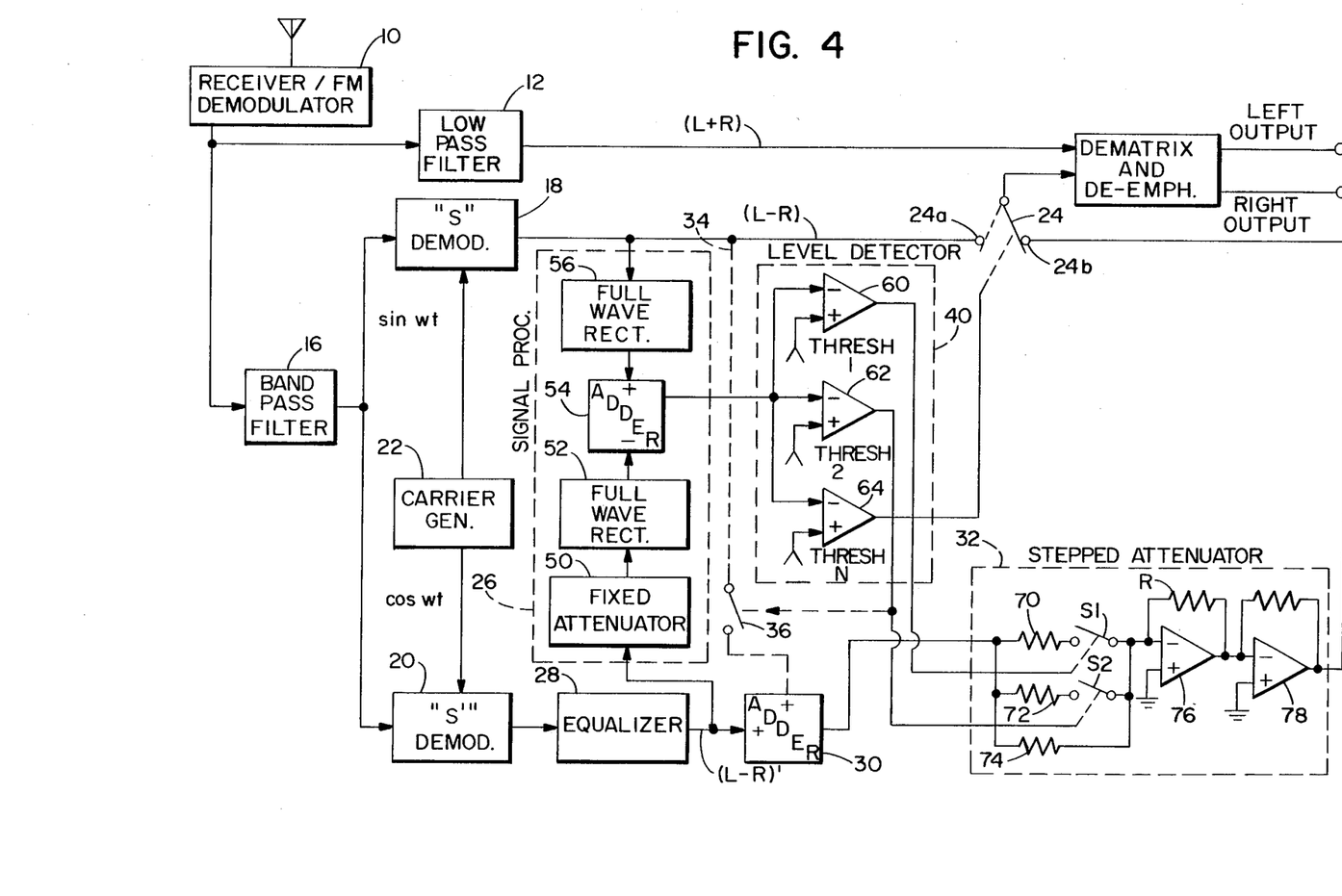
FIG. 4 is a simplified block diagram of a presently preferred implementation of the improved decoder.

Although FIG. 4 illustrates a currently preferred implementation of signal processor 26, the advantages of the invention can be realized with other, lower cost, implementations of the signal processor. For example, as shown in FIG. 3A, signal processor 26 may be only a full-wave rectifier 80 for rectifying the normal difference signal S and applying the rectified output signal to level detector 40. In this case the level detector comparators respond to only variations in level of the normal difference signal; this may alter the absolute values of their threshold potentials as compared with those employed in the FIG. 4 embodiment.

Figure 3B:
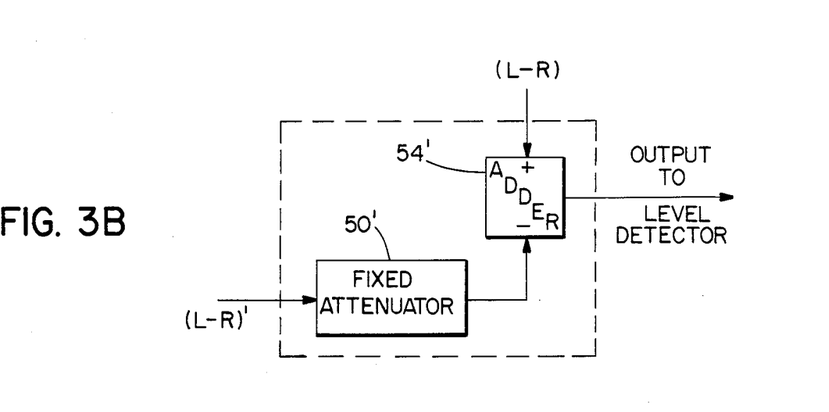

FIG. 3B illustrates another modification of the signal processor essentially consisting of only a fixed attenuator 50' for attenuating the compressed difference signal (L−R)' by an amount corresponding to the fixed reference gain depicted in FIG. 1, and an adding device 54' for subtracting the attenuated (L−R)' signal from the normal difference signal (L−R) and applying the output to the level detector.

Further, although the receiver of FIG 4 has a level detector including three comparators and a three-level stepped attenuator controlled by two comparators, in the interest of reducing the cost of decoding to a minimum yet providing acceptable operation, a single comparator may be employed to determine whether the level of an input signal level is to the left or to the right of the knee of the expansion characteristic for selecting which of signals S and S' will be de-matrixed with the sum signal: if the level is to the left of the knee then the attenuated compressed difference signal (L−R)' is selected and if the signal level is on that part of the characteristic to the right of the knee then the normal difference signal is selected for dematrixing. This arrangement would provide the same amount of signal-to-noise improvement for low level signals as would the decoder of FIG. 4 and while there would be no noise reduction for signals having levels to the right of the knee, the de-matrixed signals will exhibit proper stereo separation; in this region the level of the signal is contained in the signal.

Figure 5:
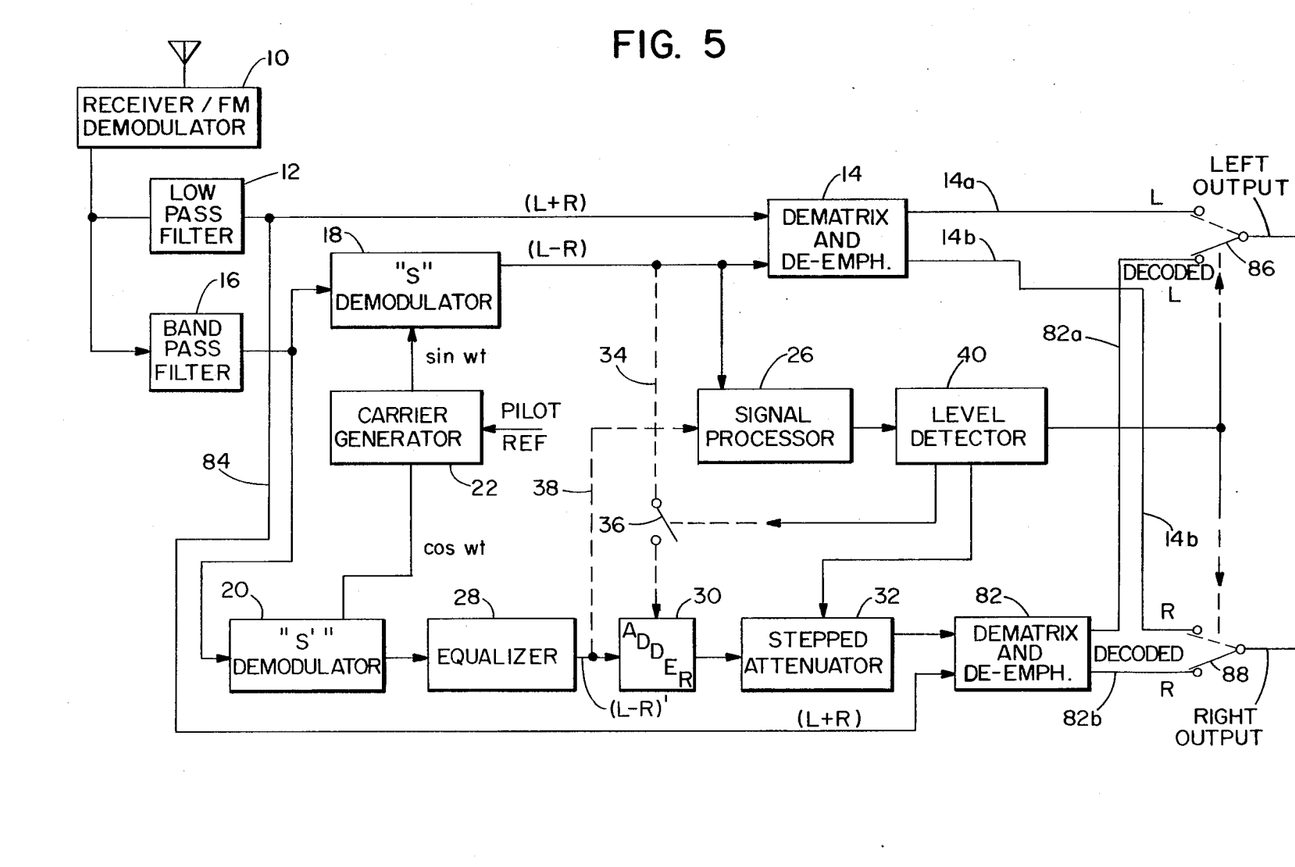
FIG. 5 is a simplified block diagram showing a modification of the receiver illustrated in FIG. 3.

The decoding systems described thus far, be it the arrangement of FIG. 4 utilizing a level detector having plural comparators and a stepped attenuator or the just-described lower-cost version, all grossly speaking automatically select on the basis of amplitude between the attenuated S' signal and the usual difference signal S' and automatically switching the one selected to the de-matrix circuit to be combined with the sum signal. FIG. 5 illustrates in block diagram form a receiver and decoded which is very similar in construction to that shown in FIGS. 3 and 4, but utilizes a different selection technique In common with the system of FIG. 3, the FIG. 5 embodiment includes a receiver/FM demodulator 10, filters 12 and 16 for separating the M, S, and S' signals, S and S' demodulators 18 and 20, signal processor 26, level detector 40 and stepped attenuator 32, which together operate as described in connection with FIG. 3 to produce a control signal at the output of level detector 40 when the level of the usual difference signal (L−R) exceeds a predetermined threshold level, or when the level of the usual difference signal exceeds the level of the compressed difference signal by a predetermined amount, and an attenuated compressed difference signal (L−R)' at the output of the stepped attenuator However, instead of selecting one or the other of signals (L−R) and attenuated (L−R)' for application to the de-matrix circuit the (L−R) and attenuated (L−R)' signals are de-matrixed with the sum signal in two separate de-matrix circuits, one for producing conventional left (L) and right (R) output signals without noise-reduction and the other for producing decoded, noise-reduced left (L) and right (R) output signals, and either the conventional or the decoded L signals and either the conventional or the decoded R signals, respectively, are selected as the final output left and right signals in response to a control signal from level detector 40.

More particularly, the sum signal (L+R) and the difference signal (L−R) from demodulator 18 are de-matrixed and de-emphasized in conventional fashion by de-matrix and de-emphasis circuit 14 to produce conventional stereo-related L and R signals on its output lines 14a and 14b, respectively. The sum signal (L+R) is also applied, via a conductor 84, to a second de-matrix and de-emphasis circuit 82 in which it is conventionally de-matrixed with the attenuated (L−R)' signal from stepped attenuator 32 to produce decoded L and R signals at its output lines 82a and 82b, respectively. The respective left output lines 14a and 82a of the two de-matrixers are connected to respective contacts of a single-pole double-throw switch 86, and the respective right output lines 14b and 82b are connected to the contacts of a second switch 88 of the same type, the switches being ganged to be switched in unison by a control signal produced by level detector 40. The switches normally are in the illustrated solid-line position so as to deliver decoded noise-reduced L and R output signals, but are switched to their dotted line positions to deliver conventional L and R output signals when level detector 40 produces a control signal which indicates that the level of the (L−R) signal is higher than a predetermined threshold potential related to signal level at the knee of the expansion characteristic (FIG. 2).

The described embodiments are exemplary only and susceptible of modification in form and detail within the scope of the invention. For example, true RMS detectors may be substituted for the full-wave rectifiers in the described signal processor circuits, and the function of stepped attenuator can be incorporated into the dematrix and de-emphasis circuit. These and such other variations and modifications as may now be suggested by those skilled in the art will be understood as forming a part of the present invention insofar as they fall within the spirit and scope of the appended claims.

We claim:

1. For use in a compatible stereo transmission system, a receiver for receiving an FM multiplex signal derived from left and right audio stereo signals and including at least a sum signal M, a stereo difference signal S amplitude-modulated on a first subcarrier, a compressed version S' of said stereo difference signal amplitude-modulated on a second subcarrier, said signal S' being said signal S compressed in accordance with a compression characteristic which has a knee at a selected input signal level below which said compression characteristic has a compression slope of unity and a fixed gain difference relative to the unity gain slope of said difference signal S and above which said compression characteristic has a compression slope substantially of infinity, said receiver comprising:

means for receiving said FM multiplex signal and deriving therefrom said sum signal M, said difference signal S and said compressed difference signal S', means for controllably attenuating said compressed difference signal S' responsive to the measured level of said difference signal S and producing an output attenuated compressed difference signal S', de-matrixing means for normally producing output left and right audio signals obtained from combining said sum signal M with said output attenuated compressed difference signal S', and means including level detector means for continuously measuring the level of said difference signal S and said compressed difference signal S' and responsively when the level of the difference signal S differs from the level of the compressed difference signal S' by a predetermined amount for causing said de-matrixing means to produce output left and right signals obtained from combining said sum signal M with said difference signal S.

2. A receiver for receiving a compatible FM multiplex signal as defined in claim 1, wherein said means for measuring further comprises signal processing means including means for attenuating said compressed difference signal S' by the amount of said fixed gain difference and producing a control attenuated compressed difference signal S', and means for comparing the level of said difference signal S with the level of said control attenuated compressed difference signal S' and applying the difference therebetween, if any, to said level detector means.

3. A receiver for receiving a compatible FM multiplex signal as defined in claim 1, wherein said means for measuring further comprises signal processing means including means for rectifying said difference signal S and producing a rectified signal S, means for attenuating said compressed difference signal by the amount of said fixed gain difference and producing a control attenuated compressed difference signal S', means for rectifying said control attenuated compressed difference signal S' and producing a rectified control attenuated compressed difference signal S', and means for comparing the level of said rectified difference signal S with the level of said rectified control attenuated compressed difference signal S' and applying the resulting difference signal therebetween, if any, to said level detector means.

4. A receiver for receiving a compatible FM multiplex signal as defined in claim 3, wherein said means for controllably attenuating said compressed difference signal S' comprises a stepped attenuator connected to receive and adapted to attenuate said compressed difference signal S' in controllable steps in response to control signals produced by said level detector means, and wherein said level detector means comprises a plurality of comparators each for comparing a difference signal produced by said comparing means with a respective different threshold potential and producing a control signal for controlling the amount by which said output compressed difference signal S' is attenuated.

5. A receiver for receiving a compatible FM multiplex signal as defined in claim 4, wherein said de-matrixing means comprises a first de-matrix circuit normally connected to receive said sum signal at one input terminal and said output attenuated compressed difference signal S' at a second input terminal, and wherein said receiver further includes switch means controllable by a control signal produced by a selected one of said comparators for connecting said difference signal S, instead of said output attenuated compressed difference signal S', to said second input terminal of said first de-matrix circuit.

6. A receiver for receiving a compatible FM multiplex signal as defined in claim 4, wherein said de-matrixing means comprises, first and second de-matrix circuits each having first and second input terminals and each adapted to produce output left and right audio signals, means connecting said sum signal M and said difference signal S to the first and second input terminals, respectively, of said first de-matrix circuit, means connecting said sum signal M and said output attenuated compressed difference signal S' to the first and second input terminals, respectively, of said second de-matrix circuit, and wherein said receiver further includes switch means for normally selecting the left and right audio output signals produced by said second de-matrix circuit and controllable by a control signal produced by a selected one of said comparators for instead selecting the left and right audio output signals produced by said first de-matrix circuit.

7. A receiver for receiving a compatible FM multiplex signal derived from left and right stereo signals and including a sum signal M, a stereo difference signal S amplitude-modulated on a first subcarrier, and a compressed version S' of said stereo difference signal amplitude-modulated on a second subcarrier of the same frequency as said first sub-carrier and in quadrature therewith, said signal S' being said signal S compressed in accordance with a compression characteristic having a knee at a selected input signal level below which said compression characteristic has a compression slope of unity and a fixed gain difference relative to the unity gain slope of said difference signal S and above which said compression characteristic has a compression slope of substantially infinity, said receiver comprising:

means for receiving said FM multiplex signal and deriving therefrom said sum signal M, said difference signal S, and said compressed difference signal S', means for controllably attenuating said compressed difference signal S' responsive to the measured level of said difference signal S and producing an output attenuated compressed difference signal S', de-matrixing means for normally producing output left and right audio signals obtained from combining said sum signal M with said output attenuated compressed difference signal S', means including level detector means connected to receive an input signal having a level related to the level of said difference signal S and for comparing the level of said input signal with a reference potential and in response to detection that the level of said input signal differs from said reference potential by a predetermined amount causing said de-matrixing means to produce output left and right audio signals obtained from combining said sum signal with said difference signal S.

8. A receiver as defined in claim 7, wherein said means for controllably attenuating comprises stepped attenuator means connected to receive and adapted to attenuate said compressed difference signal S' in controllable steps in response to signals produced by said level detector means, and wherein said level detector means comprises a plurality of comparators each for comparing said input signal with a respective different threshold potential and producing and applying to said stepped attenuator a control signal for controlling the amount by which said output compressed difference signal S' is attenuated.

9. A receiver as defined in claim 8, wherein said de-matrixing means comprises
- a de-matrix circuit having first and second input terminals and adapted to produce output left and right audio signals,
- means for coupling said sum signal to the first input terminal of said de-matrix circuit,
- means including switch means for normally coupling to the second input terminal of said de-matrix circuit said output attenuated compressed difference signal S', and
- means for applying a control signal produced by a selected one of said comparators to said switch means for disconnecting said output attenuated compressed difference signal S' and instead connecting said difference signal S to the second input terminal of said de-matrix circuit.

10. A receiver as defined in claim 8, wherein said de-matrixing means comprises:
- first and second de-matrix circuits each having first and second input terminals and adapted to produce output left and right audio signals,
- means for connecting said sum signal M and said difference signal S to the first and second input terminals, respectively, of said first de-matrix circuit,
- means for connecting said sum signal and said output attenuated compressed difference signal S' to the first and second input terminals, respectively, of said second de-matrix circuit, and
- switch means for normally selecting as receiver output signals the output left and right audio signals produced by said second de-matrix circuit and responsive to a control signal produced by a selected one of said comparators for selecting as receiver output signals the output left and right audio signals produced by said first de-matrix circuit.

11. A receiver as defined in claim 7, wherein said receiver further comprises signal processing means for producing and applying said input signal to said level detector means, said signal processing means comprising:
- rectifying means for full-wave rectifying said difference signal S and producing a rectified difference signal S, and
- means for applying said rectified difference signal as said input signal to said level detector means.

12. A receiver as defined in claim 7, wherein said receiver further comprises signal processing means comprises means for producing and applying said input signal to said level detector means, said signal processing means comprising:
- means for attenuating said compressed difference signal S' by the amount of said fixed gain difference and producing a control attenuated compressed difference signal S',
- combining means for combining said control attenuated compressed difference signal S' and said difference signal S and producing an output signal proportional to the difference in level between said difference signal S and said control attenuated compressed difference signal S', and
- means for applying said output signal as said input signal to said level detector means.

13. A receiver as defined in claim 12, wherein said signal processing means further comprises:
- first rectifier means for full-wave rectifying said control attenuated compressed difference signal S' and applying the resulting rectified signal to said combining means, and
- second rectifier means for full-wave rectifying said difference signal S and applying the resulting rectified signal to said combining means.

14. A receiver as defined in claim 8, wherein said receiver further includes signal processing means comprising:
- means for attenuating said compressed difference signal S' by the amount of said fixed gain difference and producing a control attenuated compressed difference signal S',
- first rectifier means for full-wave rectifying said control attenuated compressed difference signal S',
- second rectifier means for full-wave rectifying said difference signal S, and
- means for combining the rectified signals produced by said first and second rectifier means and applying as an input signal to said level detector means a signal proportional to the difference in level between said difference signal S and said control attenuated compressed difference signal S'.

* * * * *